United States Patent [19]
Seki et al.

[11] Patent Number: 5,138,557
[45] Date of Patent: Aug. 11, 1992

[54] CORNER SHAPE INSERTION METHOD

[75] Inventors: Masaki Seki; Takashi Takegahara, both of Tokyo; Takeshi Arakaki, Yamanashi, all of Japan

[73] Assignee: Fanuc Ltd, Kawasaki, Japan

[21] Appl. No.: 474,026

[22] PCT Filed: Aug. 21, 1989

[86] PCT No.: PCT/JP89/00845
§ 371 Date: Apr. 19, 1990
§ 102(e) Date: Apr. 19, 1990

[87] PCT Pub. No.: WO90/02369
PCT Pub. Date: Mar. 8, 1990

[30] Foreign Application Priority Data
Aug. 25, 1988 [JP] Japan .................. 63-211335

[51] Int. Cl.$^5$ ............................................. G05B 19/18
[52] U.S. Cl. ........................... 364/474.25; 364/188; 364/474.24; 364/191
[58] Field of Search ............ 364/188, 191, 192, 474.22-474.27, 364/518-521; 340/706-710

[56] References Cited
U.S. PATENT DOCUMENTS

| | | | |
|---|---|---|---|
| 4,663,705 | 5/1987 | Kishi et al. | 340/706 |
| 4,763,119 | 8/1988 | Matsuhara et al. | 340/709 |
| 4,789,855 | 12/1988 | Ozeki | 340/709 |
| 4,802,083 | 1/1989 | Isobe et al. | 364/474.27 |
| 4,875,033 | 10/1989 | Kato et al. | 340/706 |
| 4,926,311 | 5/1990 | Matsumura et al. | 364/474.22 |
| 4,939,635 | 7/1990 | Seki et al. | 364/474.22 |
| 4,949,279 | 8/1990 | Takakura et al. | 340/706 |
| 5,065,332 | 11/1991 | Seki et al. | 364/474.22 |
| 5,067,087 | 11/1991 | Seki et al. | 364/474.24 |

FOREIGN PATENT DOCUMENTS
63-46512  2/1988  Japan .
63-204412  8/1988  Japan .

Primary Examiner—Jerry Smith
Assistant Examiner—Jim Trammel
Attorney, Agent, or Firm—Staas & Halsey

[57] ABSTRACT

The invention relates to a corner shape insertion method for inserting a corner shape such as a chamfered or rounded corner portion having prescribed dimensions at a corner of a profile (OLF) comprising a plurality of figure elements (S1-S8). When limits (indicated by the dashed-line segment) of the profile in which corner shapes are to be inserted is specified by designating two figure elements (S1, S5) of the prolfile (OLF), angles defined by mutually adjacent ones of the figure elements within the limits of the profile are obtained and it is determined whether the angles reside within set angular limits. If an angle lies within the set angular limits, the corner shapes (C2, C4) of prescribed dimensions are inserted between the figure elements.

2 Claims, 7 Drawing Sheets

FIG. 2

| EXECUTE | POINT/POINT GROUP DEFINITION *1* | LINEAR DEFINITION *2* | CIRCULAR DEFINITION *3* | SPECIAL SHAPE DEFINITION *4* | SHAPE PROCESSING |
|---|---|---|---|---|---|
| SHAPE DATA INPUT | | | | | |
| NEW DE-FINITION | | | | | |
| INITIAL SETTING | | | | | |

SHAPE EDITING — 5
CORNER R: COLLECTIVE INPUT — T1
CHAMFER: COLLECTIVE INPUT — T2

FIG. 4
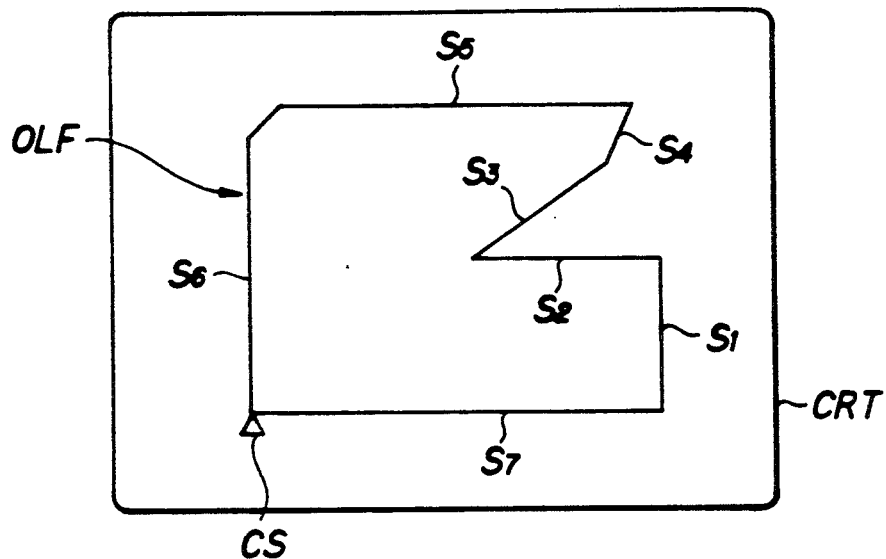
FIG. 5
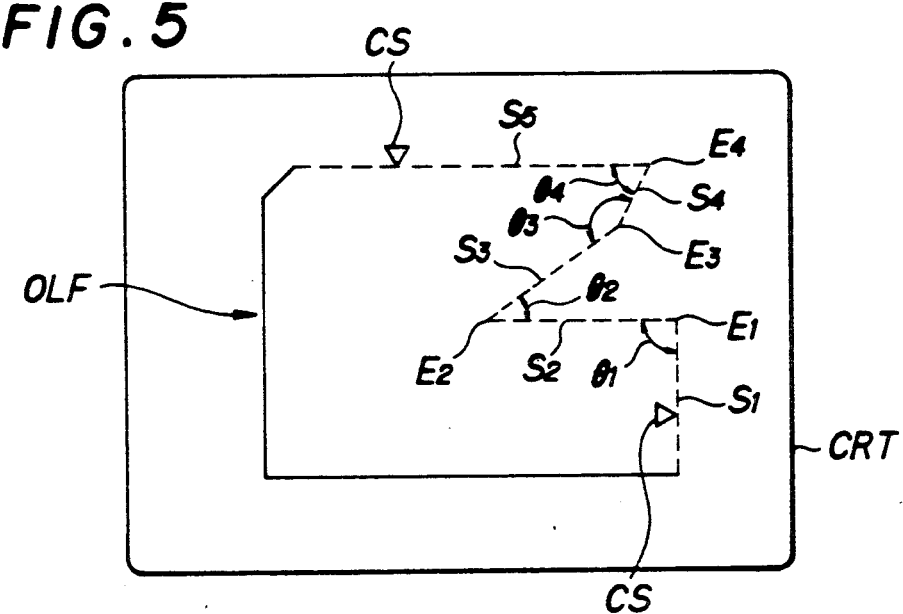
FIG. 8
(a) | SELECT ELEMENT WHICH IS START OF LIMITS |—M2
(b) | SELECT ELEMENT WHICH IS END OF LIMITS |—M3
(c) | DESIGNATE DIRECTION OF ELEMENT LIMITS |—M4

CORNER SHAPE INSERTION METHOD

TECHNICAL FIELD OF THE INVENTION

This invention relates to a method of inserting a corner shape and, more particularly, to a corner shape insertion method for inserting a corner shape such as a chamfered or rounded corner at a corner between figure elements of a profile comprising a plurality of figure elements.

DESCRIPTION OF THE RELATED ART

In an automatic programming system for creating NC data using an automatic programming language such as APT (automatically programmed tools) or FAPT, (a) a part program based on the automatic programming language is created by defining points, straight lines and circular arcs using simple symbols (this is referred to as "figure definition"), and defining a profile using these defined points, straight lines and circular arcs (referred to as "motion statement definition"), and (b) the part program based on the automatic programming language is subsequently converted into NC data, which comprises NC data (EIA codes or ISO codes) in a format capable of being executed by an NC unit.

In such an automatic programming system, a profile OLF comprising figure elements S1–S3 illustrated in FIG. 11 is defined by the following part program:

```
P₁ = x₁, y₁
P₂ = x₂, y₂
P₃ = x₃, y₃
S₁ = P₁, P₂
S₂ = P₂, P₃
S₃ = P₃, P₁     ... The foregoing is a figure
                    definition portion.
S₁
S₂
S₃              ... The foregoing is a profile
                    definition portion.
PEND            ... Program end
```

Thereafter, the following operations and processing are performed in order to insert roundness at corners $E_1$–$E_3$ between mutually adjacent figure elements: For example, in order to insert roundness of radius $r_1$ at the corner $E_2$ between elements $S_1$, $S_2$, the operator, by a prescribed operation, places the system in a rounding input mode, designates the corner $E_2$ in the rounding input mode and thereafter inputs a circular arc dimension (radius $r_1$). When this is done, the system defines the profile definition portion of the part program as $S_1$, $r_1R$
$S_2$
$S_3$ More specifically, $r_1R$ (where $r_1$ represents radius) indicating rounding is disposed between the two linear elements $S_1$, $S_2$ where roundness is inserted. Though the foregoing is for a case where a roundness arc is inserted at a corner, the operation would be similar in a case where a chamfered shape is inserted.

There are cases where a roundness arc having the same dimensions, or a chamfer having the same dimensions, is inserted at all corners within predetermined limits of a profile. In such cases, the conventional method is such that the corners within the predetermined limits must be designated one at a time, after which the same numeric value must be entered in response to a message calling for input of dimensions. A problem that arises is that the operation for inserting the corner shapes requires an exorbitant amount of time.

SUMMARY OF THE INVENTION

Accordingly, an object of the present invention is to provide a corner shape input method through which the insertion operation can be performed quickly and easily when a chamfer having the same dimensions or a roundness having the same dimensions is inserted at all corner portions within predetermined limits.

In accordance with the present invention, the foregoing object is attained by the following method. Profile limits of a profile in which a corner shape is to be inserted are specified by designating two figure elements constituting the beginning and end of an insertion portion of the profile. An angle is obtained between those mutually adjacent figure elements in the insertion portion; (within the limits of the profile). Finally a corner shape of predetermined is inserted dimensions between the mutually adjacent figure elements if the angle defined by the mutually adjacent figure elements is within a set angle.

BRIEF DESCRIPTION OF THE DRAWINGS

FIG. 2 is a view for describing the principal portions of a menu chart;

FIG. 4 is a dialog screen illustrating a profile;

FIG. 5 is a dialog screen illustrating the range of the profile in which corner shapes are to be inserted;

FIG. 8 is a view for describing messages displayed when specifying the limits of a profile;

DESCRIPTION OF THE PREFERRED EMBODIMENTS

Figure 1:
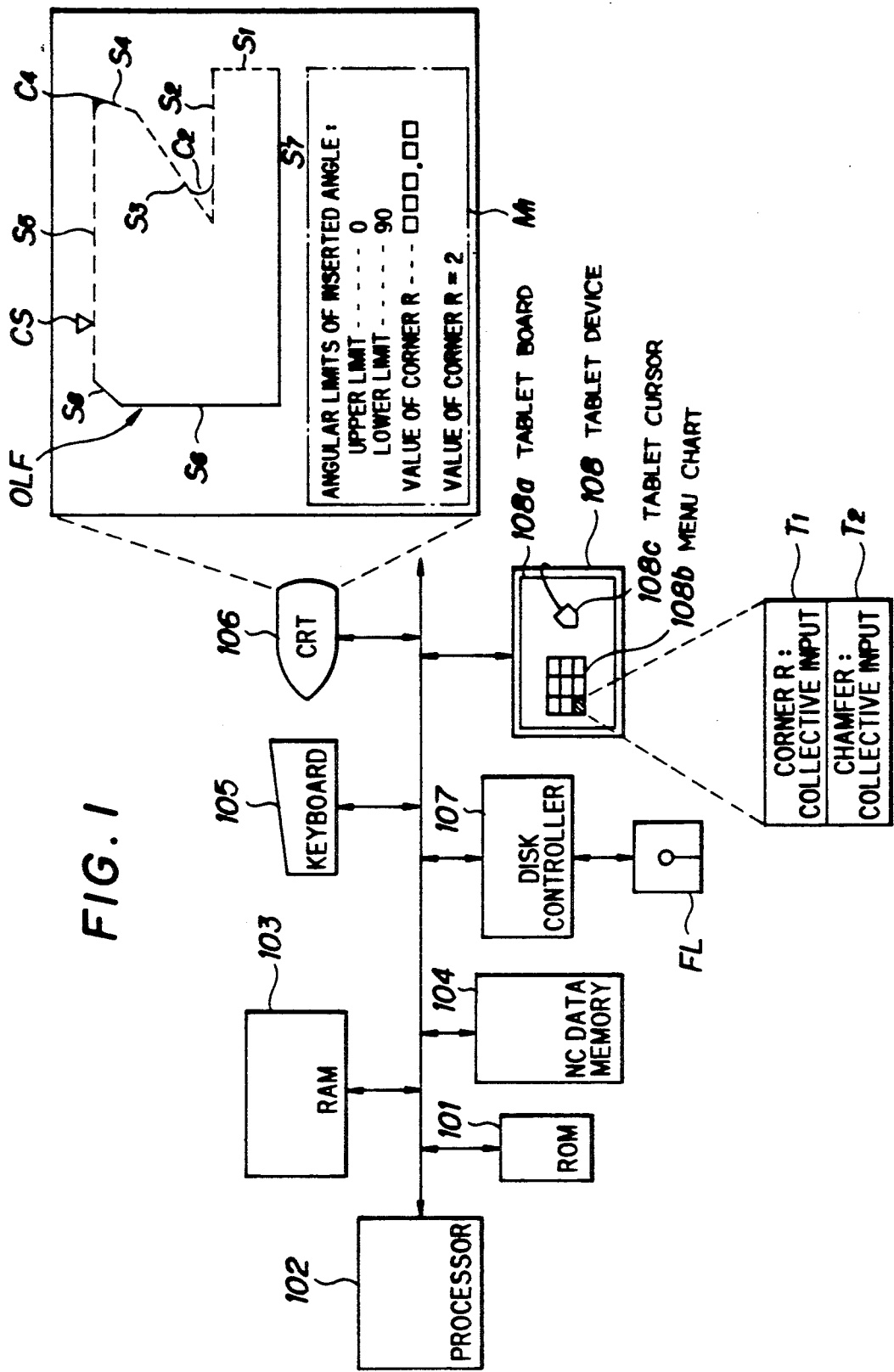
FIG. 1 is a block diagram of an apparatus for practicing the present invention.

FIG. 1 is a block diagram of an apparatus for practicing the present invention.

Numeral 101 denotes a ROM storing a loading program and the like. 102 is a processor for executing automatic programming processing. 103 is a RAM for storing a system program read in from a floppy FL, as well as various parameters and results of processing. Numeral 104 denotes an NC data memory for storing finally created NC data having an executable format. Numeral 105 is a keyboard, 106 is a display unit (CRT), 107 is a disk controller, and 108 is a tablet device having a tablet surface 108a to which a menu chart 108b having menu items is affixed. Prescribed menu items are picked by a tablet cursor 108c. A graphic cursor on a display screen is moved by moving the cursor 108a on the tablet surface. FL represents a floppy disk.

On the display screen of the display unit 106, OLF represents a profile, $S_i$ (i=1, 2 . . . , 8) denote figure elements constituting the profile, C2, C4 are corner shapes (rounded shapes), CS is a graphic cursor, and M1 denotes a message window for entering prescribed data.

FIG. 2 is a view for describing the principal portions of the menu chart 108b, in which numeral 1 denotes a "POINT/POINT GROUP DEFINITION" section, 2 a "LINEAR DEFINITION" section, 3 a "CIRCULAR DEFINITION" section, 4 a "SPECIAL-SHAPE DEFINITION" section, and 5 a "SHAPE EDITING" section. The "SHAPE EDITING" section 5 is provided with "CORNER R: COLLECTIVE INPUT" $T_1$, which indicates an item for inserting rounded portions en bloc, and "CHAMFER: COLLECTIVE INPUT" $T_2$, which indicates an item for inserting chamfered portions en bloc.

When the range of the profile (the dashed-line segment of the profile OLF in FIG. 1) in which corner shapes are to be inserted is specified by designating two figure elements $S_i$, $S_j$ (e.g., figure elements $S_1$, $S_5$) in the profile OLF, the angles defined by mutually adjacent figure elements within the limits of the profile are obtained. If the angles are within set angular limits, the corner shapes C2, C4 of the prescribed dimensions are inserted between the figure elements defining the angles.

Figure 3:
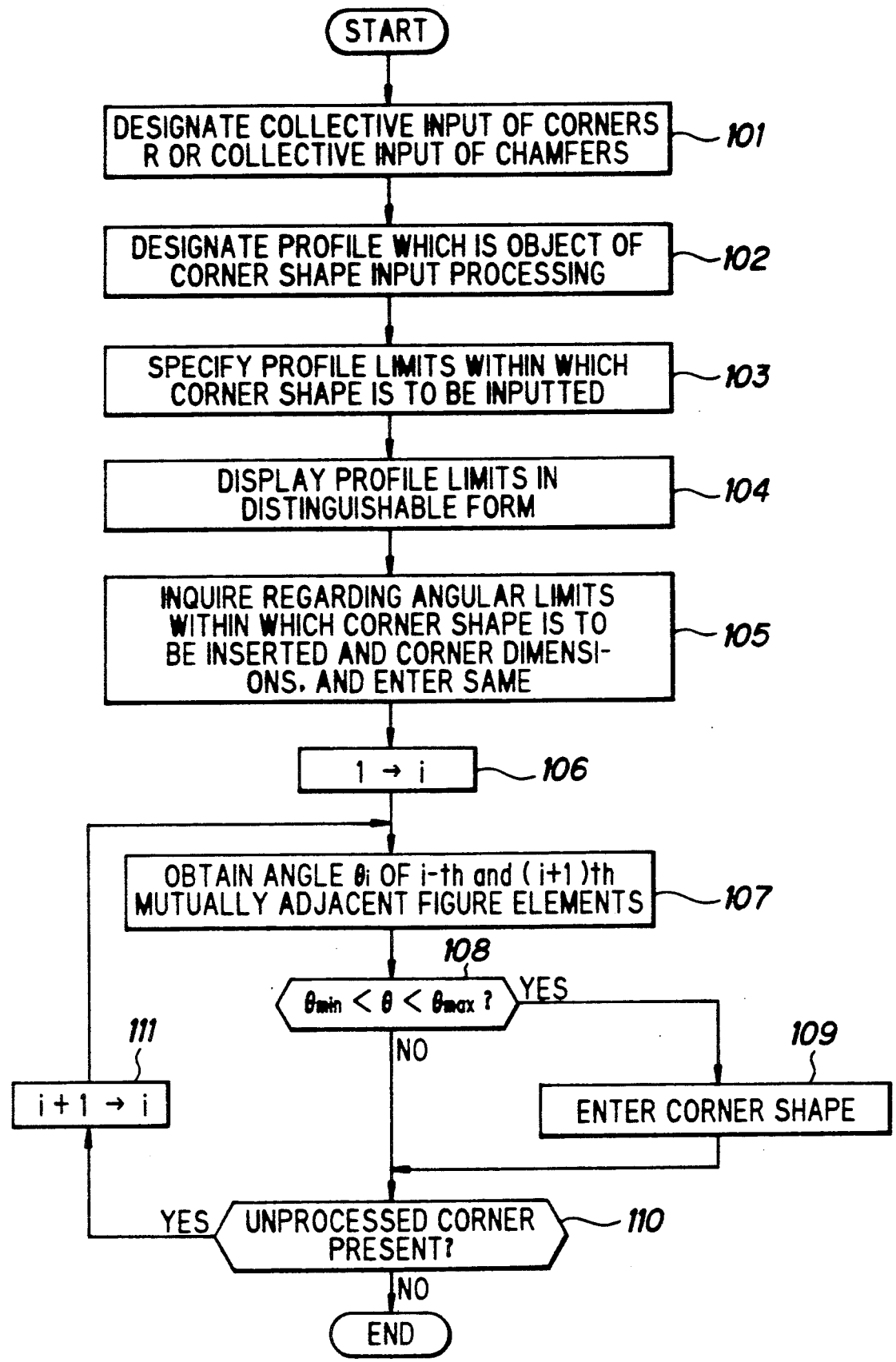
FIG. 3 is a flowchart of processing for inserting a corner shape according to the invention.
Figure 6:
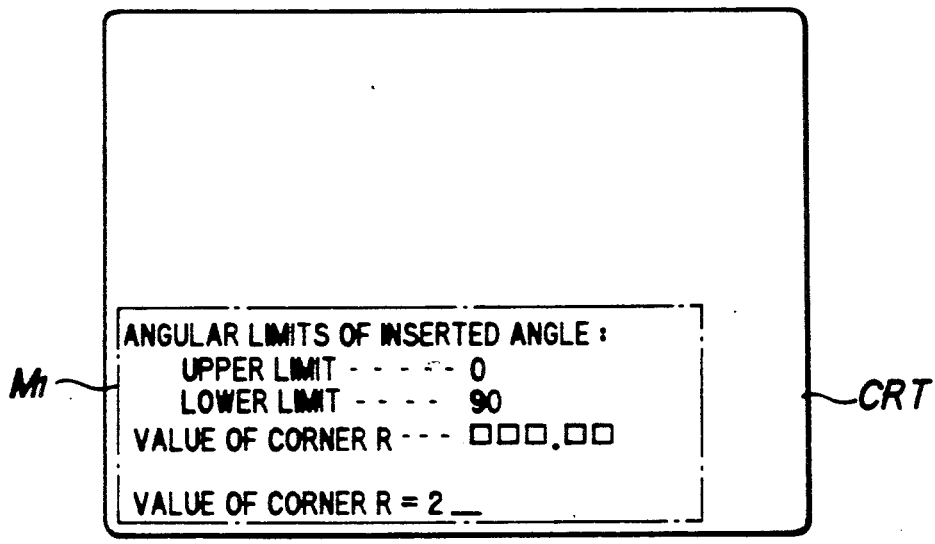
FIG. 6 is a dialog screen for inputting angular limits defined by mutually adjacent figure elements, as well as a corner radius.
Figure 7:
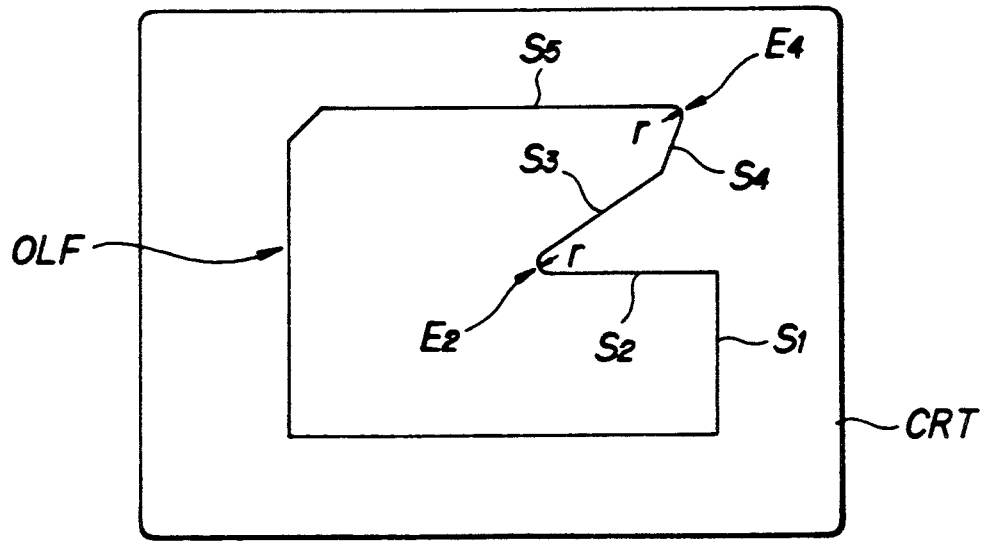
FIG. 7 is a dialog screen illustrating the profile after the corner portions are inserted.

FIG. 3 is a flowchart of processing for corner shape insertion according to the present invention, and FIGS. 5 through 7 are examples of dialog screens of the present invention. The corner shape insertion method of the invention will now be described in accordance with this flowchart and the examples of the dialog screens. It is assumed that the part program for specifying the profile OLF shown in FIG. 4 has already been created and stored in the RAM 103, and that the profile is being displayed on the display screen 106 is a prescribed color (e.g., green).

The operator selects the item $T_1$ "CORNER R: COLLECTIVE INPUT" (FIG. 2) from the menu chart 108b on tablet 108 (step S101). When this is done, the processor 102 displays the graphic cursor CS on the display screen 106 and makes it possible to select the profile in which a corner R (a rounded arc) is to be inserted. In a case where a plurality of profiles are to be defined, the processor 102 displays a message calling for selection of a profile.

Accordingly, the operator aligns the graphic cursor CS with the profile OLF requiring insertion of roundness arcs, thereby selecting this profile (step S102).

When the profile OLF has been selected, the processor 102 successively displays messages M2, M3, M8 (FIG. 8) for specifying the limits of the profile in which the roundness arcs are to be inserted, and the operator responds to these messages by designating the limits of the profile (step S103). Specifically, in response to the message M2 [FIG. 8(a)], the operator aligns the graphic cursor CS with the figure element $S_1$ to pick this element, thereby designating the figure element $S_1$, which is the starting end of the limits. In response to the message M3 [FIG. 8(b)], the operator picks the figure element $S_5$, thereby designating the figure element $S_5$, which is the end of the limits. Further, in a case where the profile OLF is a closed shape, arc keys (an $G$ key and an $\curvearrowright$ key) on the keyboard 105 are used to designate whether the profile range embraced by the two designated figure elements $S_1$ and $S_5$ is a profile segment in the clockwise direction or a profile segment in the counter-clockwise direction. For example, if the direction is counter-clockwise, with the initially designated figure element serving as a reference, the arc key ($G$ key) indicating the counter-clockwise direction is pressed in response to the message M4 [FIG. 8(c)].

By thus designating the foregoing profile limits, processor 102 identifies the limits within which the corner shapes are inserted and causes the figure elements, or, insertion portion, within this range (indicated by the dashed-line portion in FIG. 5) to be displayed in a distinguishable form, such as a color (e.g., blue) different from that of the other figure elements (step S104).

Next, the processor 102 displays a message M1 (FIG. 6), which is for specifying the angular limits of the corner to be rounded and the dimensions of the roundness, in a form superimposed on the profile (the illustration of the profile is deleted from FIG. 6). Accordingly, the operator responds to the message M1 by designating a lower-limit angle $\theta_{min}$ (e.g., 0°) and an upper-limit angle $\theta_{max}$ (e.g., 90°) and designating a numerical value "2" of the arc radius (step S105).

When the dimensions of roundness and the angular limits of the corner have been specified, the processor 102 performs the operation 1→i, obtains an angle $\theta_i$ (FIG. 5) defined by i-th and (i+1)th mutually adjacent figure elements within the limits of the profile (steps S106, S107), and checks to see whether the angle is within the set angular limits ($\theta_{min}$-$\theta_{max}$) (step S108). If the angle (e.g., $\theta_2$, $\theta_4$) is within these limits, then the processor inserts the roundness arc having the arc diameter of 2 mm at the corner (e.g., E2, E4) between the i-th and (i+1)th figure elements defining the angle, and displays the result on the CRT 106 (step S109; see FIG. 7).

Thereafter, the processor checks to see whether the foregoing processing has ended for all corners within the profile limits (step S110). If the answer is "NO", then the processor performs the operation i+1→i (step 111) and repeats the processing from step 107 onward. If the answer is "YES", then the processor ends the corner shape insertion processing.

Figure 9:
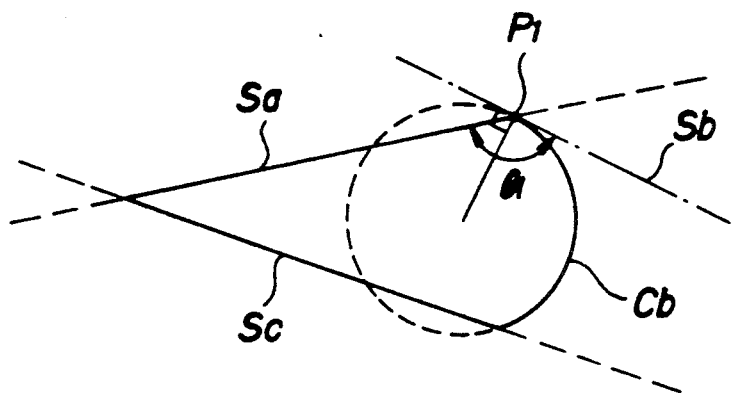
FIG. 9 is a view for describing a method of computing a corner angle in a case where a figure element is a circular arc.

If, in the calculation of the angle $\theta_i$ defined by mutually adjacent figure elements, the figure elements include a circular arc, and the angle defined by a linear element Sa and the arcuate element Cb shown, for example, in FIG. 9 is calculated, a line segment Sb passing through an intersection $P_1$ of both elements and tangent to the arcuate element Cb is obtained, and the angle $\theta_i$ defined by the linear element Sa and line segment Sb is calculated.

Figure 10:
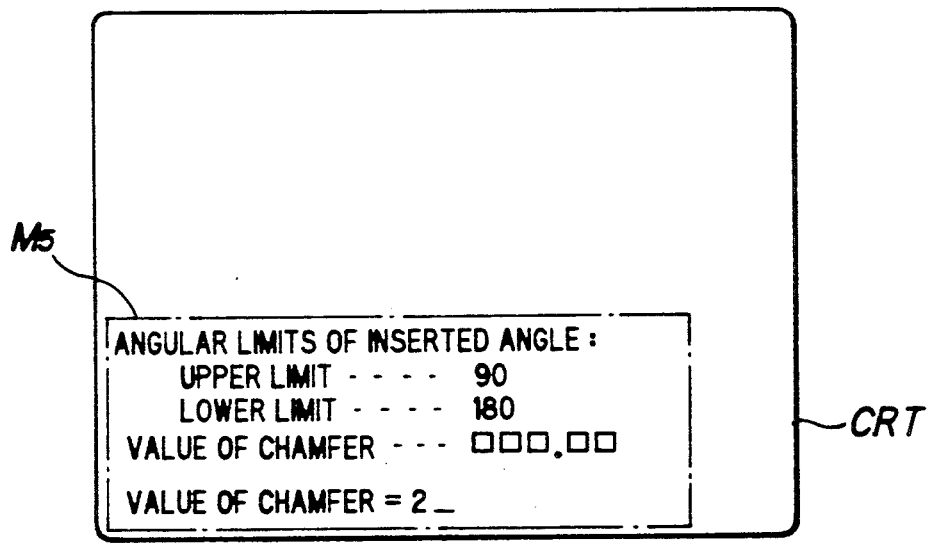
FIG. 10 is a dialog screen for inputting angular limits defined by mutually adjacent figure elements, as well as chamfer dimensions.
Figure 11:
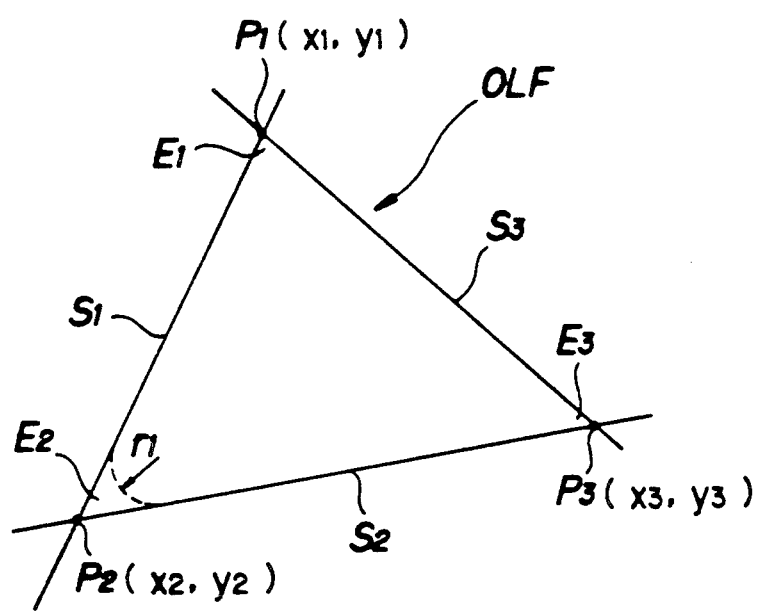
FIG. 11 is a view of a profile for describing a prior-art method.

Though the foregoing description regards collective insertion of rounded portions, collective insertion of chamfered portions can be performed in the same manner. Specifically, when collectively inserting chamfered portions, the item "CHAMFER: COLLECTIVE INPUT" $T_2$ (see FIG. 2) is selected at step 101, then two figure elements constituting the profile OLF are designated in dialog fashion to specify the profile limits in which chamfered shapes are to be inserted, and the chamfer dimensions and angular limits of corners at which the chamfered shapes are to be inserted are similarly designated in dialog fashion (see FIG. 10). As a result, the processor 102 obtains the angles of mutually adjacent figure elements within this range of the profile. If an angle is within the set angular limits, the chamfered shape having the prescribed dimensions is inserted between the figure elements defining this angle.

Thus, in accordance with the present invention, the limits of a profile in which corner shapes are to be inserted are specified by designating two figure elements in the profile constituting the beginning and ending figure elements of the insertion portion of the profile. At such time, angles defined by mutually adjacent figure elements within these limits of the profile are obtained. If an angle is, within a set angle, a corner shape having prescribed dimensions is inserted between the figure elements defining the angle. As a result, when corners within certain limits are chamfered or rounded to the same numeric value, the insertion operation can be performed quickly and easily. As a result, NC data obtained on the basis of the profile can be created quickly and easily.

We claim:

1. A corner shape insertion method for inserting a corner shape such as a chamfered or rounded corner at a corner between mutually adjacent figure elements of a profile, comprising the steps of:
  (a) specifying profile limits, in which a corner shape is to be inserted, by designating two figure elements comprising a beginning and end of an insertion portion of the profile, said specifying comprising the steps of:
    (a1) when the profile is a closed shape, designating one of a clockwise direction and a counter-clockwise direction from one of the two figure elements that are beginning and end points of the insertion portion; and
    (a2) specifying the insertion portion in which the corner shape is to be inserted, based on the designated direction;
  (b) setting angular limits for the mutually adjacent figure elements in the insertion portion;
  (c) setting corner dimensions of the corner shape;
  (d) obtaining an angle between each pair of the mutually adjacent figure elements in the insertion portion; and
  (e) inserting the corner shape of said corner dimensions between said mutually adjacent figure elements only if the angle between the mutually adjacent figure elements is within said angular limits.

2. A corner shape insertion method for inserting a corner shape between mutually adjacent figure elements in a profile, comprising the steps of:
  (a) receiving an indication from a user of profile limits, comprising the steps of:
    (a1) receiving designations of at least two figure elements defining the profile limits for corner shape insertion; and
    (a2) receiving a designation of one of clockwise and counter-clockwise directions and a starting figure element to define a portion of the profile when the profile has a closed shape;
  (b) receiving an indication of angle limits from the user;
  (c) inserting the corner shape between only the adjacent figure elements within the profile limits, and only when an angle between the adjacent figure elements is within the angle limits.

* * * * *